(12) United States Patent
Babour et al.

(10) Patent No.: US 7,826,972 B2
(45) Date of Patent: Nov. 2, 2010

(54) METHODS OF ELECTROMAGNETIC LOGGING USING A CURRENT FOCUSING RECEIVER

(75) Inventors: Kamal Babour, Bures sur Yvette (FR); Christian Besson, Le Pecq (FR); Kambiz Safinya, Garches (FR); Philip Heelan, Co. Clare (IR); Edward Nichols, Berkeley, CA (US)

(73) Assignee: WesternGeco L.L.C, Houston, TX (US)

( * ) Notice: Subject to any disclaimer, the term of this patent is extended or adjusted under 35 U.S.C. 154(b) by 484 days.

(21) Appl. No.: 11/694,108

(22) Filed: Mar. 30, 2007

(65) Prior Publication Data
US 2008/0238428 A1 Oct. 2, 2008

(51) Int. Cl.
*G01V 3/26* (2006.01)
(52) U.S. Cl. .......................................... 702/2
(58) Field of Classification Search ............... 702/1, 702/2, 5–11, 14, 38, 57, 65, 77, 188, 189; 324/350, 365
See application file for complete search history.

(56) References Cited

U.S. PATENT DOCUMENTS

| 3,670,247 A * | 6/1972 | Gutton et al. ............... 455/40 |
| 4,027,234 A | 5/1977 | Mosnier |
| 4,617,518 A | 10/1986 | Srnka |
| 4,633,182 A | 12/1986 | Dzwinel |
| 5,770,945 A * | 6/1998 | Constable ................... 324/350 |
| 2008/0169817 A1 | 7/2008 | Morrison |
| 2009/0001985 A1 | 1/2009 | Besson |

FOREIGN PATENT DOCUMENTS

| GB | 2070345 | 9/1981 |
| WO | WO0214906 | 2/2002 |
| WO | 2006026361 | 3/2006 |
| WO | 2007053251 | 5/2007 |

OTHER PUBLICATIONS

Ph.D. Thesis, Dec. 3, 1984, Study of a Method for Electrical Detection of Conductive Anomalies Near a Drilling Site, by Stephane Sainson, with English translation.
U.S. Appl. No. 11/770,902, Final Rejection dated Jul. 24, 2009, pp. 1-8 and attachments.
U.S. Appl. No. 11/770,902, Non-Final Rejection dated Feb. 5, 2009, pp. 1-7 and attachments.
www.emgs.com (1 page) dated on or before Sep. 26, 2007.
PCT Search Report, dated Dec. 9, 2008, for International Appl. No. PCT/US2008/067971 (7 pages).

(Continued)

*Primary Examiner*—Mohamed Charioui (57) ABSTRACT

A method for determining a formation electrical property under a sea floor includes obtaining measurement data using a receiver having an impedance lower than an impedance of seawater at a measurement site; correcting the measurement data to obtain corrected data corresponding to data that would have been acquired using a receiver having an impedance matched with the impedance of the seawater; and deriving the formation property from the corrected data.

10 Claims, 5 Drawing Sheets

OTHER PUBLICATIONS

Boerner, David E. et al., Orthogonality in CSAMT and MT Measurements, Geophysics, vol. 58, No. 7, Jul. 1993, pp. 924-934.

Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.

Chave, Alan D. et al., Electrical Exploration Methods in Applied Geophysics vol. 2, Electrical Exploration Methods for the Seafloor, Chapter 12, 1991, pp. 931-966.

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications. 1993.

Evans, Rob L. et al., On the Electrical Nature of the Axial Melt Zone at 13 Degrees N. On the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons, 1990.

Kaufman, A. et al., Methods in Geochemistry and Geophysics, 16, 1984.

Kvenvolden, K. et al., A Primer on the Geological Occurrence of Gas Hydrate, Gas Hydrates: Relevance to World Margin Stability and Climate Change, Geological Society, London, Special Publications, 137, 9-30, 1998.

MacGregor, L. et al., The Ramesses Experiment-III. Controlled-Source Electromagnetic Sounding of the Reykjanes Ridge . . , Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 199, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572. Feb. 18, 1998.

Das, Umesh C., Apparent Resistivity Curves in Controlled-Source Electromagnetic Sounding Directly Reflecting True Resistivities in a Layered Earth, Geophysics vol. 60, No. 1, Jan-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, Marelek 1999.

Maurer, Hansruedi et al., Optimized Design of Geophysical Experiments, SEG Paper, 1997.

Grant, I.S. et al., Electromagnetic Waves, Chapter 11, pp. 365-407.

* cited by examiner

METHODS OF ELECTROMAGNETIC LOGGING USING A CURRENT FOCUSING RECEIVER

FIELD OF THE INVENTION

The present invention relates to methods and apparatus for subsurface logging. Particularly, the present invention relates to methods for electromagnetic measurements using a current focusing receiver.

BACKGROUND OF THE INVENTION

During exploration and reservoir assessment and development in the oil and gas industry, hydrocarbons, such as oil and gas, as well as geological structures that tend to bear hydrocarbon, may be detected based on their properties (e.g., mechanical and electromagnetic (EM) properties) that are different from those of the background geological formations.

Electromagnetic (EM) measurements are commonly used in oil and gas exploration. Among the EM properties, the resistivity ($\rho$), which is an inverse of the electrical conductivity ($\sigma$), is particularly useful. This in because hydrocarbon-bearing bodies, such as oil-bearing reservoirs, formations containing methane hydrate, and gas injection zones, have higher resistivities compared with their background geological formations. For example, hydrocarbon-bearing reservoirs typically have resistivities one to two orders of magnitude higher than those of the surrounding shale and water-bearing zones. Therefore, resistivity mapping or imaging may be useful in locations the zones of interest in contrast to the background resistivity. This method has been used successfully in both land and seafloor exploration.

Resistivity mapping may be achieved by generating an EM signal above the formations of interest and receiving the resulting EM field at selected locations. The received data is affected by a number of parameters, for example, the distance between the EM signal source and the receivers, EM field frequency, polarity of the EM waves, depth and thickness of the reservoir, resistivity of the hydrocarbon bearing zones, and the surrounding geological formations. In marine applications, the received signal may depend on the resistivity of the seawater, which may be a dynamic variable that depends on the water temperature, salt content, etc.

The EM signal may be from natural sources or from artificial sources. Among the EM methods, magneto-telluric (MT) methods rely on the naturally-occurring EM fields in the stratosphere surrounding the earth. Because carbonates, volcanics, and salt all have large electrical resistivity as compared with typical sedimentary rocks, MT measurements may produce high-contrast images of such geostructures. MT measurements are particularly useful in examining large-scale basin features and for characterizing reservoirs below basalt (volcanics) layers beneath a sea bed.

Controlled source electromagnetic ("CSEM") methods use EM transmitters, called sources, as energy sources, and the receivers measure the responses of the geological structures to the transmitted signals. The transmitter may be a direct current (DC) source, which injects a DC current into the geological formations. DC currents are typically injected into the formations using contacting electrodes. Recent EM measurement methods use EM sources that produce time-varying electrical and/or magnetic (EM) fields. The EM fields may be a pulse generated by turning on and off an EM transmitter, and in this case, the receivers effectively measure a pulse response of the geological structures. EM measurements may sue a transmitter that transmits a fixed frequency or a range of frequencies. The higher frequency EM sources permits resolution of finer structures, whereas the lower frequency EM sources allows one to probe deeper into the formations.

In marine explorations, low-frequency EM methods are typically used. The low-frequency EM waves may induce a current, i.e., the Faraday (eddy) current, to flow in the earth formation and in the sea water. The current density depends on the resistivity of the earth formation and the sea water. A voltage drop across two locations produced by the current may be measured and used to infer the resistivity distribution in the formation. Alternatively, one may measure the secondary magnetic fields produced by the induced current.

Figure 1:
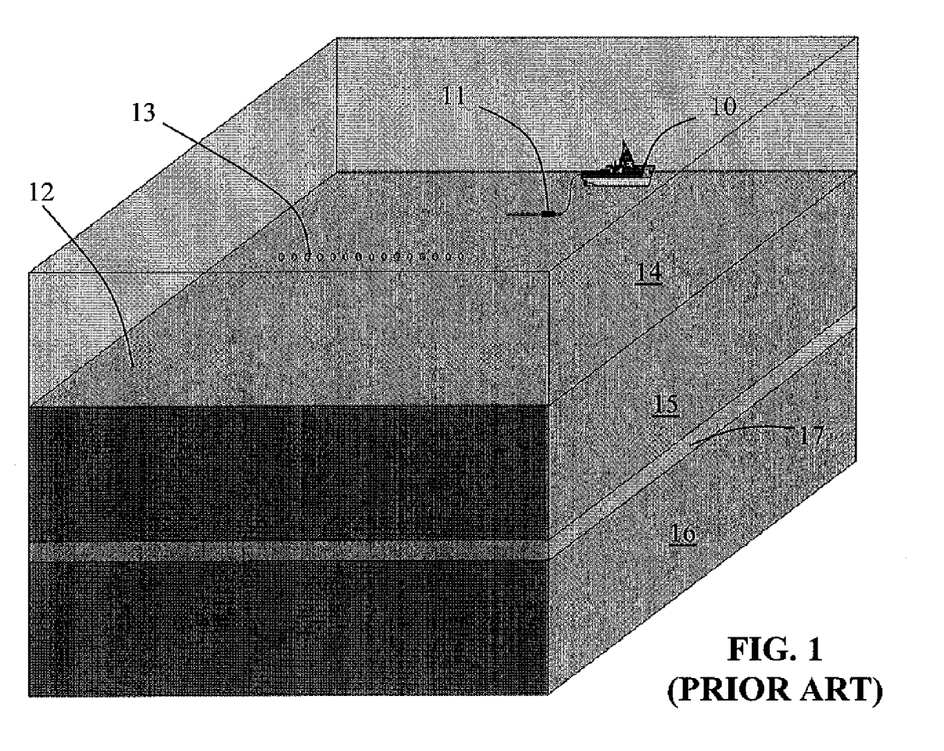
FIG. 1 shows a conventional controlled source electromagnetic measurement system in an offshore logging operation.

As discussed, CSEM uses an artificial EM source to generate controlled EM fields that penetrate the ocean and the subsea formations. As illustrated in FIG. 1, in a conventional CSEM method, an electrical dipole transmitter 11 is towed by a ship 10, typically at a short distance above the seabed 12. In other cases, the transmitter 11 may be towed near the surface or at other depths. The transmitter 11 induces EM fields in the sea water 14, geological layers 15 and 16 and the oil-bearing layer 17.

To detect the EM signals, a number of receivers 13 are deployed on the seabed 12. The EM signals measured by the seafloor receivers 13 may then be used to solve the resistivity distributions in the geological structures, including layers 15, 16, and 17. When the transmitter 11 is not used, the receivers 13 may be used to detect EM signals induced by the naturally-occurring MT fields.

Figure 2:
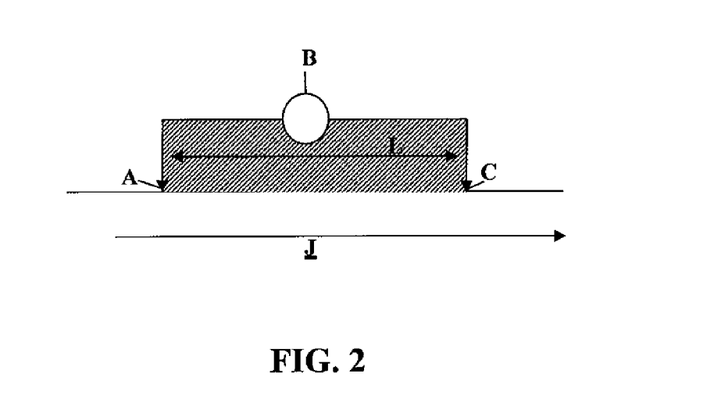
FIG. 2 shows a schematic illustrating a conventional electric field measurement by measuring a voltage drop across a known distance.

A traditional receiver used in such surveys measures a voltage drop across a short distance. As illustrated in FIG. 2, such receivers typically uses a voltmeter B to measure the voltage drop at a selected distance L, i.e., at locations A and C. The voltage drop ($\Delta V$) across A and C, as measured by the voltmeter B, is then used to estimate the electric field E. As a result, the electric field (E) can be simplified as a voltage drop between locations A and C divided by the distance between A and C.

$$E = \frac{(V_C - V_A)}{L}$$

The sensitivity of a receiver depends on the strength of the signals detected. Because seawater is very conductive, the voltage drop across the measurement points (i.e., A and C) will be very small. For the same electric field E, the detected voltage $\Delta V$ would be larger if the distance L between the locations A and C is larger because $\Delta V = L\,E$. However, it is impractical to increase L beyond a certain limit for the purpose of increasing the sensitivity of the measurements. This is because it will be more difficult to transport and deploy large-sized receivers, and the reliability of the receivers also suffers.

Due to the technical difficulties in measuring the electric fields by voltage drops, it may be more advantageous to measure an electric field E by measuring electric current densities J and the electric conductivity $\sigma$ of the sea water. Then, the electric field E may then be derived using the Ohm's law, $$E = J/\sigma, \tag{1}$$

where J is the current density, and $\sigma$ is the electric conductivity. This principle has been applied to measuring electric fields using opposing conductive plates in a cubic or rectangular receiver frame, as taught in French Patent 8419577, issued to Jean Mosnier, and in WO 2006/026361 by Steven Constable. This French Patent and the WO 2006/026361 are incorporated by reference in their entireties. One example of such a receiver is illustrated in FIG. 3.

Figure 3:
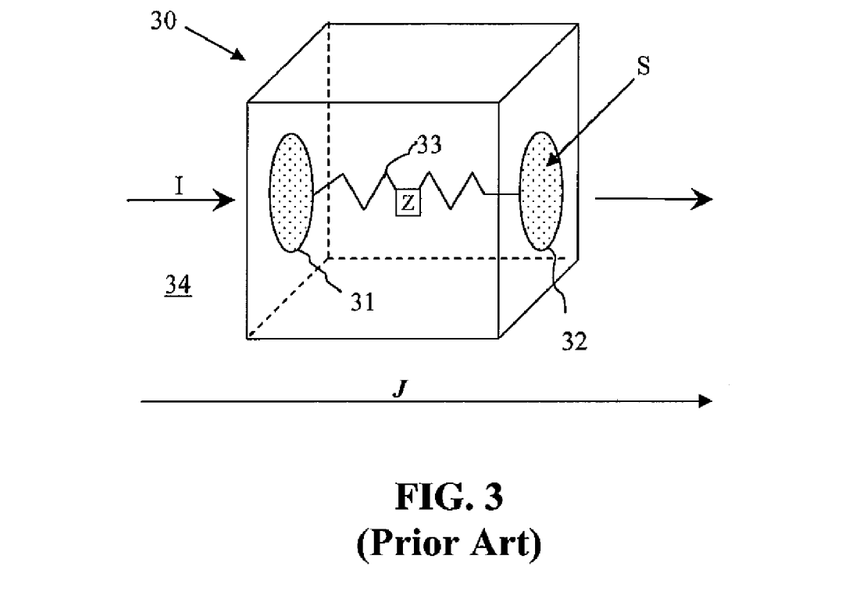
FIG. 3 shows a prior-art receiver having a cubic frame with electrodes for measuring an electric field by measuring an electric current.

As shown in FIG. 3, a receiver device 30 includes electrodes 31 and 32 disposed on opposite sides of the cubic frame. The electrodes are connected via a circuitry 33 having an impedance Z, which may be tuned such that the impedance of the receiver is identical to that of the seawater 34. If the impedance between the electrodes 31 and 32 is matched to that of the seawater, then the presence of the receiver in the seawater will not perturb the electric field of the measurement site. Therefore, the current I that passes through electrodes 31 and 32 will be the same current that would have passed through the space occupied by the receiver 30, if the receiver 30 were not present.

Although it is desirable to tune the receiver impedance Z to that of the surrounding seawater, this often is impractical because the seawater resistance may not be known beforehand. Furthermore, the resistance (or conductivity) of seawater can vary with time, temperature, salt concentration, etc. Although Mosnier disclosed a way to overcome this problem by using a mechanical device to open and close, at regular intervals, the communication between one of the electrodes and the outside environment, this approach is not practical because it requires a substantial amount of energy.

In addition to the above described problem, the sensitivities of the receivers of Mosnier may be low due to various factors, such as noises generated by the receiver itself or from the environment. Therefore, while the prior art receivers have been useful in oil and gas exploration, there remains a need for better receivers that are easy to use and can provide robust measurements.

SUMMARY OF INVENTION

In one aspect, the invention relates to methods for determining a formation electrical property under a sea floor. A method in accordance with one embodiment of the invention includes obtaining measurement data using a receiver having an impedance lower than an impedance of seawater at a measurement site; correcting the measurement data to obtain corrected data corresponding to data that would have been acquired using a receiver having an impedance matched with the impedance of the seawater; and deriving the formation property from the corrected data.

Other aspects and advantages of the invention will be apparent from the following description and the appended claims.

DETAILED DESCRIPTION

The following description and the disclosed examples relate to apparatus and methods for electromagnetic measurements by measuring current densities. One or more disclosed methods use receivers that have impedance intentionally set to lower than the impedance of the environment surrounding the receiver such that the electric current flowing through the receiver is increased i.e., the current is focused through the receiver. Thus, a receiver in accordance with one or more disclosed examples may be referred to as a "current-focusing" receiver. In such a receiver, the signal-to-noise ratios of the receivers are enhanced, i.e., the methods and apparatus of the invention are more sensitive.

While the disclosed examples are not limited to any particular shape of the receivers or any particular type of logging operations, the following description will use a Mosnier type receiver in subsea logging operations to illustrate embodiments of the invention. The use of such examples is for clarity of illustration, and not intended to limit the scope of the invention.

Referring again to FIG. 3, the current (I) flowing through the electrodes 31 and 32 is a function of current density (J) and the surface areas of the electrodes 31 and 32. That is, $$I = \int\!\!\int_S \vec{j} \cdot \vec{ds} = |\vec{j}| \cdot S,$$

wherein S is the surface area of the electrode. Thus, the average current density may be derived from the measured current (I) and the surface area of the electrode (S). The current density, j, is a function of the conductivity, $\sigma$, of the medium and the electric field, E. That is, $j = \sigma \cdot \vec{E}$. Thus, the average electric field may be derived from the current density, j, and the conductivity of the medium, $\sigma$. Therefore, $$|\vec{E}| = \frac{I}{S} \cdot \frac{1}{\sigma}.$$

As noted above, prior art receivers, such as that disclosed by Mosnier, typically require impedance matching, i.e., the impedance between the electrode pairs is matched with that of the seawater such that the presence of the receivers do not perturb the electrical fields to be measured. However, seawater conductivity depends on various factors, including the depth, salt concentrations, temperatures, time, etc. It is difficult to know beforehand the precise conductivity of the seawater at the site of receiver deployment. In order to maintain the impedance matching, Mosnier discloses a mechanism using a mechanical device to open and close, at regular intervals, the communication between one of the electrodes and the outside environment. This technique is difficult to use because of the large amount of energy required to put it in operation.

Thus, while it is possible to include circuitries to dynamically adjust the impedance between the electrodes to match the seawater impedance, this approach is difficult in practice. Accordingly, although impedance matching simplifies the interpretation of the measured signals, impedance matching is not always practical. Furthermore, the electrodes of such a receiver are typically separated by a relatively short distance (about 1-2 m). The voltage drop within such a short distance in the sea water is very small, resulting in only a very small amount of electric current flowing through the electrodes. In fact, such signals might not be much higher than the noises that can arise from the receiver or the environment. As a result, the signal-to-noise ratios of such measurements will be very low. To obtain reliable measurements, it would be desirable to improve the signal-to-noise ratios of such receivers.

In accordance with disclosed examples, receivers for EM measurements are intentionally tuned to have low impedance relative to the impedance of the liquid (such as seawater) to be measured. By having lower impedance, these receivers will provide an easier path for the current flows. In essence, these receivers will focus the currents through the measurement electrodes, leading to improved signal-to-noise ratios and thus improved sensitivities of the receivers.

Figure 4:
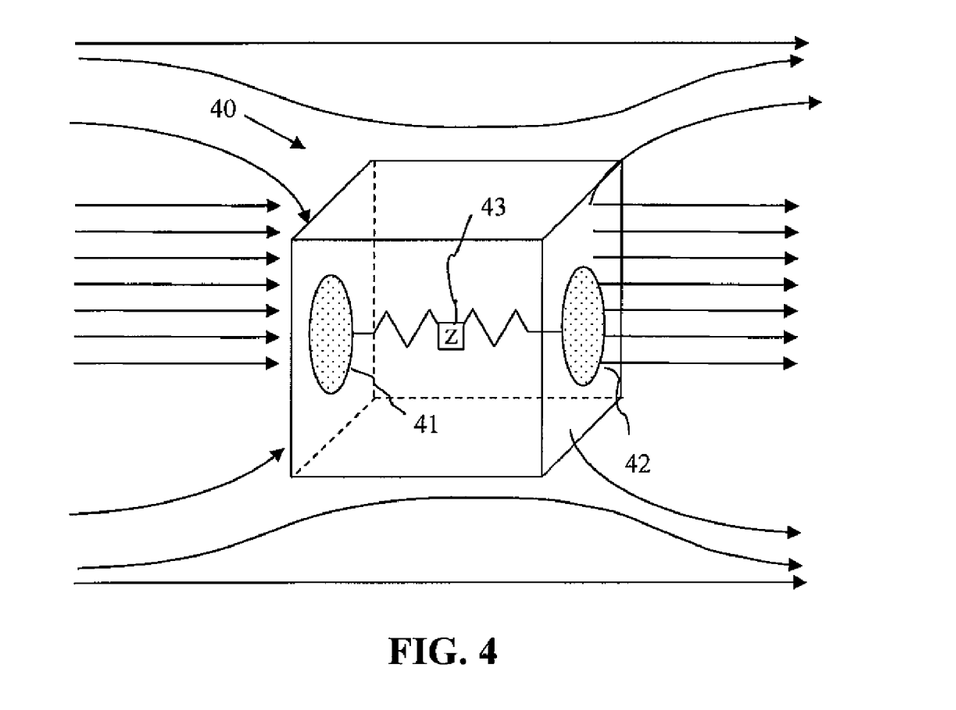
FIG. 4 shows one example of a current-focusing receiver.

As example of a receiver 40 having lowered impedance is illustrated in FIG. 4. As shown in FIG. 4, because the receiver 40 has lower impedance 43 than the surrounding sea water, the flow of electrical current is increased, or "focused." through the receiver 40. This causes enhanced current measurements and therefore enhanced signal-to-noise ratios. As shown in FIG. 4, the receiver 40 includes a first electrode 41 and a second electrode 42. A current path having a selected impedance 43 is connected between the electrodes 41, 42. The current lines in FIG. 4 show how the electrical current may be focused through the receiver 40.

Although the receiver shown in FIG. 4 is illustrated as a cube, one of ordinary skill in the art would appreciate that embodiments of the invention are not so limited. For example, the receiver may form a tetrahedron receiver for measuring the current density.

A number of advantages can arise form a receiver design illustrated in FIG. 4. For example, the measured electric currents are effectively "focused" or amplified, leading to an improved signal-to-noise ratio (SNR) in the measurements. In addition, the electrochemical noise caused by the surfaces of the electrodes contacting the seawater is reduced because these noise sources are effectively short circuited by the low impedance of the receiver.

Figure 5:
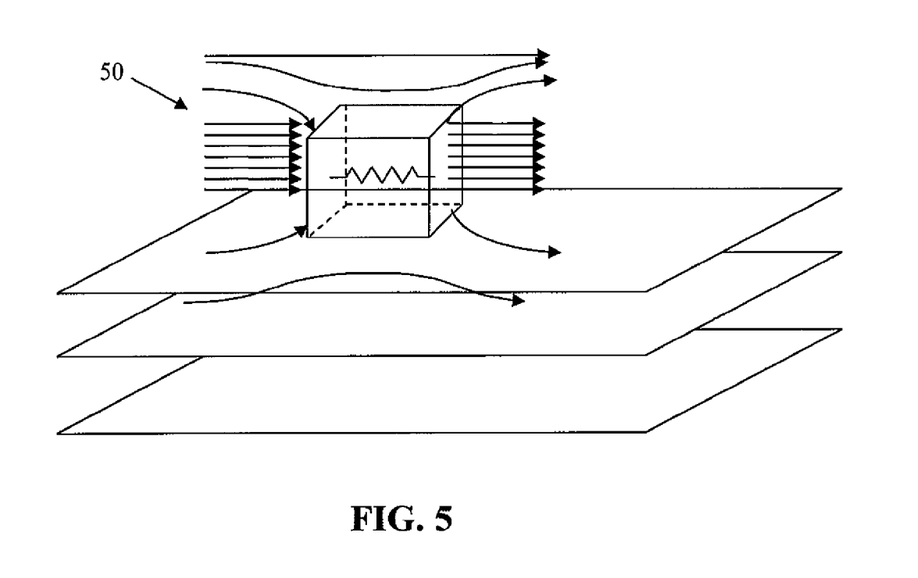
FIG. 5 shows an example of a schematic illustrating distortions induced by a current-focusing receiver.

Focusing the currents through the receiver will also alter the electrical properties of the environment surrounding the receiver. FIG. 5 shows a schematic illustrating the effects of the low impedance receiver 50 on the environment around the measurement site. It is evident that the presence of the low impedance receiver 50 will alter the current densities in the subterranean formations, where the electric properties may be of interest. The influence of such a receiver 50 does not reach too far into the environment. In most cases, this influence is estimated to reach a distance about twice the dimension of the receiver. Nevertheless, such influence may render the measurements obtained by such a receiver not to correlate directly with the properties of the measurement site.

Therefore, although the receiver shown in FIG. 4 can have an improved sensitivity, the measurements recorded by such a receiver will need correction before an accurate property of the measurement site can be derived. In accordance with certain disclosed examples, the distortion induced by the device may be modeled. The modeling can be achieved through the use of any software capable of solving for the potential distribution with appropriate boundary conditions, such as finite difference, finite elements, etc. The modeling may be performed, beforehand or after the measurements have been acquired.

Figure 6:
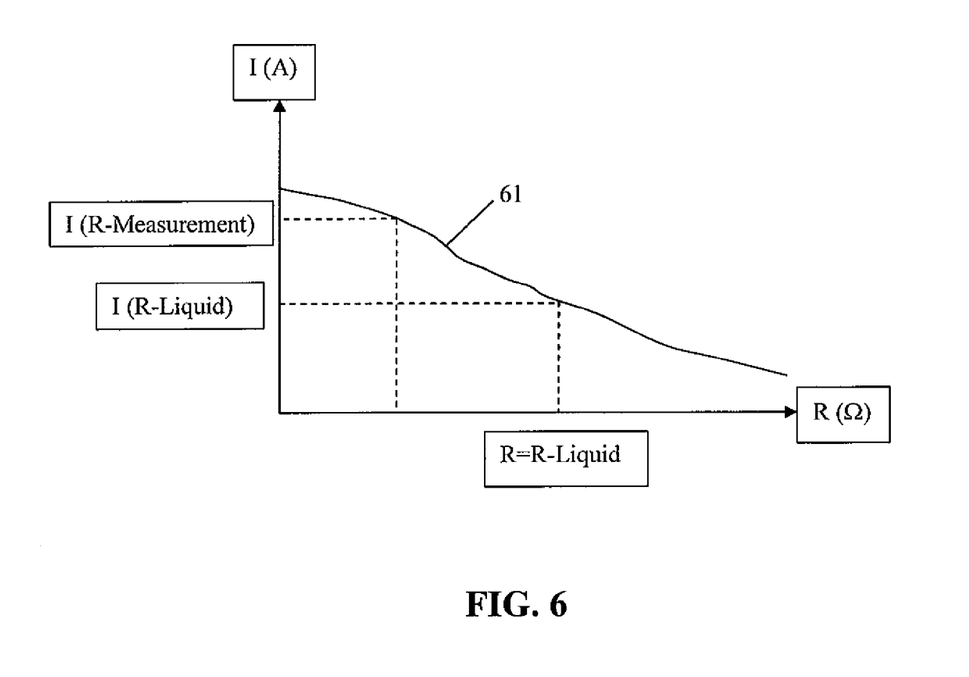
FIG. 6 shows an example graph for correcting measurements obtained with a current-focusing receiver.

In accordance with some disclosed examples, the modeling can be used to construct a function of currents as a function of impedance, I=F(R), wherein J is the current circulating in the impedance R. FIG. 6 shows one such example, wherein a graph correlates current measurements with the impedance (curve 61).

Figure 7:
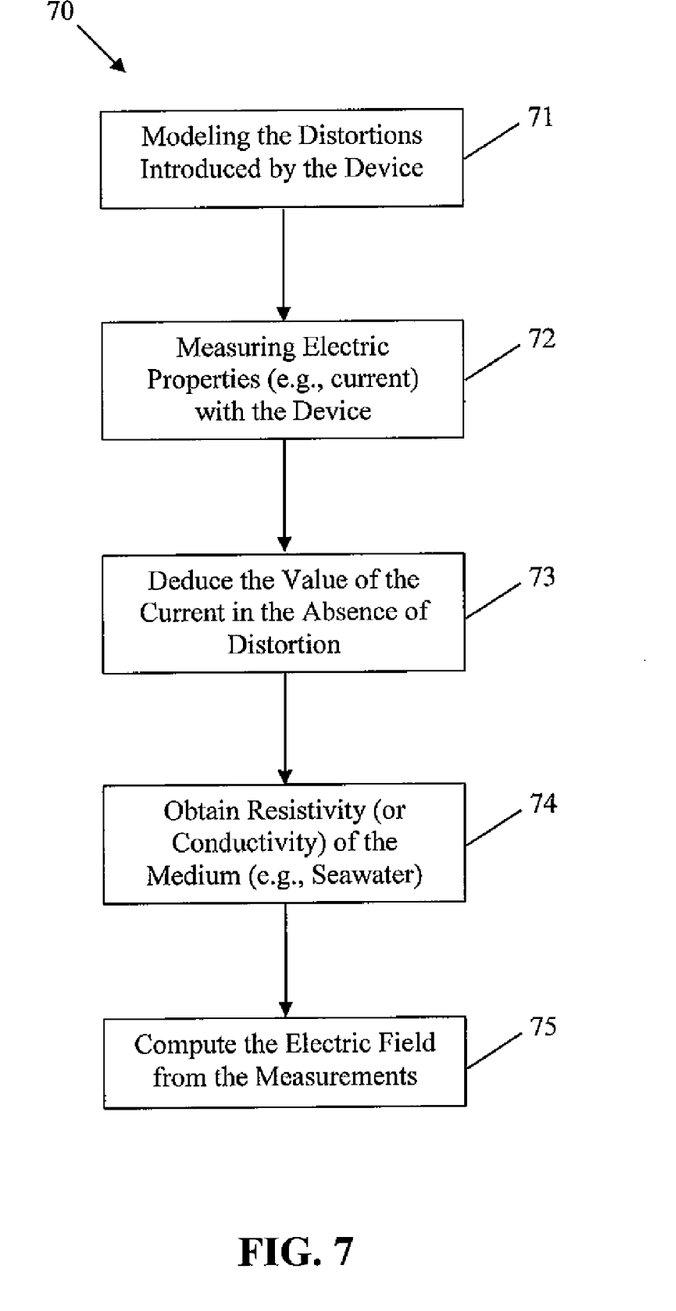
FIGS. 7 and 8 are flowcharts illustrating example methods for making electromagnetic measurements.

Some embodiments of the invention relate to methods for EM measurements using a receiver of the invention. FIG. 7 illustrates a general method in accordance with one embodiment of the invention. As shown in FIG. 7, illustrates a general method 70 may consist of modeling distortions created by the low impedance receiver (step 71). The device is used to obtain measurements from the site of interest (step 72). Note that steps 71 and 72 may be performed in a different order. Next, the true measurements in the absence of the distortions induced y the low impedance receiver is derived (step 73). This may be achieved by using modeling or a function shown in FIG. 6.

The resistivity or conductance of the seawater (or other medium) is then obtained (step 74). The resistivity or conductivity data of the seawater may be measured while performing the measurement of the site. Alternatively, this information may be obtained from prior measurements or calculation. Finally, the electric field of the seawater is computed (step 75). Based on the corrected measurements (e.g., the current, I) the known surface area of the electrodes (S), and the seawater resistivity ($\rho$) or conductivity ($\sigma$), the electric field (E) can be derived as $E=(I/S)\cdot\rho$ or $E=I/(S\cdot\sigma)$.

Note that the method describe in FIG. 7 is but one example. Other variations are possible. For example, some of the steps may be performed in a different order. Therefore, the method shown in FIG. 7 is for illustrate and not intended to limit the scope of the invention.

Figure 8:
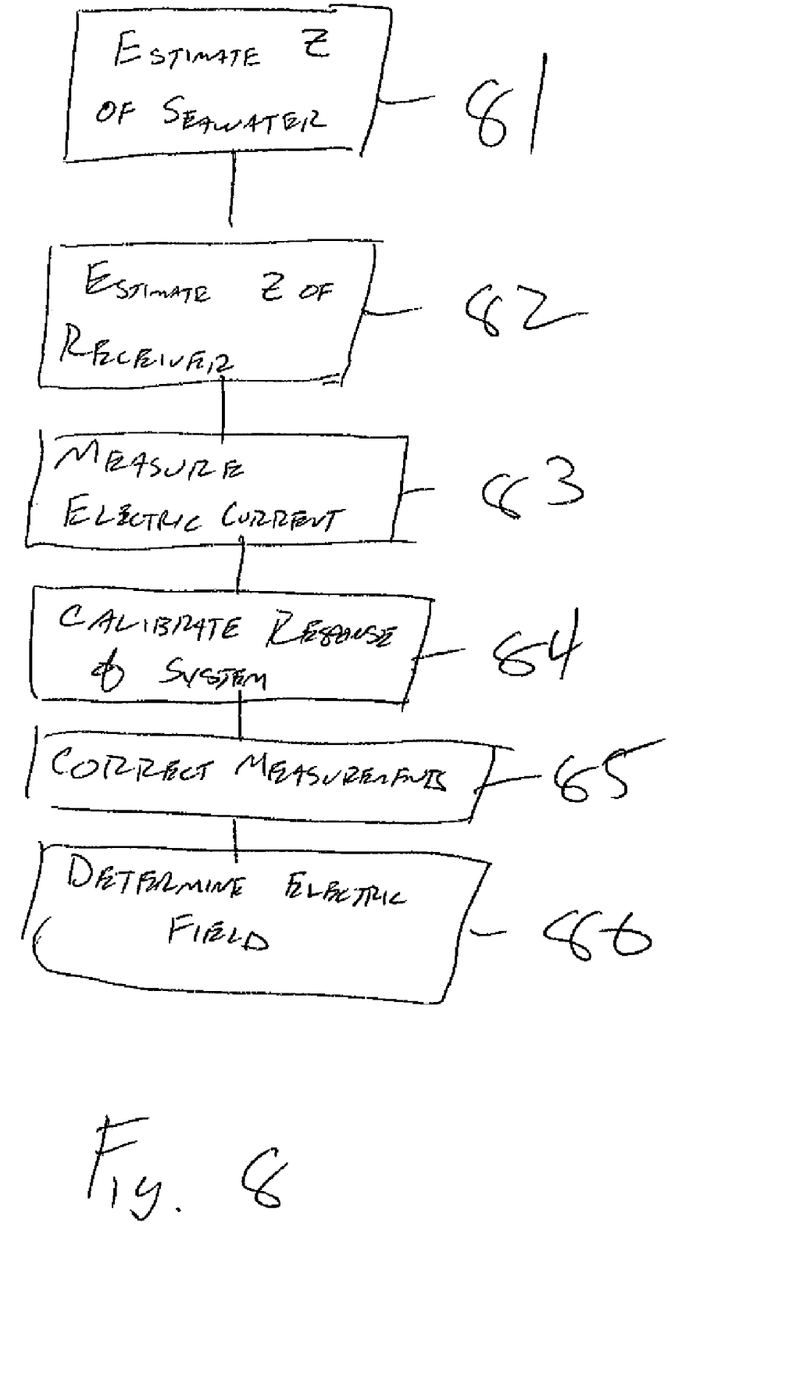

For example, FIG. 8 shown another example of a method for measuring EM properties. The method includes estimating the impedance of the seawater surrounding the receiver, at 81. This may be done based on the known salinity and temperature of the water. In another example, the impedance of the sea water surrounding the receiver may be measured.

The method may also include estimating the impedance of the receiver system, at 82. In one example, this includes estimating the impedance between an opposing pair of electrodes. In another example, this may include determining the impedance between a plurality of electrode pairs. In another example, this includes determining the impedance for a receiver system for a receiver such as a tetrahedron receiver. In one example, estimating the impedance of the receiver system is done my measuring the impedance. In another example, the impedance may be set to a known value. The impedance may be set in-situ by automatic methods, or the impedance may be set before the receiver is deployed.

The method may include making a measurement of the electric current passing through the receiver, at 83.

The method may next include calibrating the response of the system, at 84. This may be done using the estimate of the impedance of the receiver and the estimate of the impedance of the surrounding sea water. The method may next include correcting the measurements based on the calibrated response, at 85. In one example, this may be performed before the usual modeling and inversion that is used to determine the electrical properties of the subsurface. In another example, correcting the measurements based on the calibrated response may be take into account in the modeling and inversion.

Finally, the method may include determining the electric field at the measurement site, at 86. This may be performed as part of the modeling and inversion. Ultimately, the data may lead to a resistivity map of the subsurface.

It is noted that the order of steps is not important. They may be performed in any order, as is known in the art.

Embodiments of the invention may have one or more of the following advantages. Embodiments of the invention provide enhanced receivers for EM logging. Receivers in accordance with embodiment of the invention are designed to have a relative lower impedance so as to provide better SNR. Using the approaches of the invention, the necessity of impedance matching is removed, while the sensitivities of the receivers are enhanced.

While the invention has been described with respect to a limited number of embodiments, those skilled in the art, having benefit of this disclosure, will appreciate that other embodiments can be devised which do not depart from the scope of the invention as disclosed herein. For example, although the exemplary embodiments of the invention have been described in terms of sea bed logging in the environment of sea water, one of ordinary skill in the art would appreciate that the receivers and methods of the invention may also be applied to other types of measurements. Accordingly, the scope of the invention should be limited only by the attached claims.

What is claimed is:

1. A method for determining a formation electrical property under a sea floor, comprising:
   obtaining measurement data using a receiver having an impedance selected to be lower than an impedance of seawater at a measurement site;
   correcting the measurement data to obtain corrected data corresponding to data that would have been acquired using a receiver having an impedance matched with the impedance of the seawater; and
   deriving the formation property from the corrected data.

2. The method of claim 1, wherein the receiver comprises two electrodes disposed on a receiver frame at a selected distance, and wherein the measurement data comprises an electric current measurement.

3. The method of claim 2, wherein the deriving the formation property involves computing an electric field (E) using the electric current measurement (I), a surface area of the electrodes (S), and a resistivity of the seawater ($\rho$) according to $E = \rho \cdot (I/S)$.

4. The method of claim 3, further comprising measuring the resistivity of seawater at the measurement site.

5. The method of claim 1, wherein the correcting the measurement data is performed by modeling distortions on the measurement data induced by the presence of the receiver.

6. The method of claim 5, wherein the modeling uses finite difference or finite element analysis.

7. The method of claim 1, wherein the deriving the formation property comprises computing an electric field.

8. The method of claim 1, wherein the correcting the measurement data is by using a function correlating measured currents with impedance.

9. The method of claim 1, further comprising determining the impedance of the receiver, wherein the impedance of the receiver is selected from the group consisting of:
   an impedance between an opposing pair of electrodes in the receiver; and
   an impedance between a plurality of electrode pairs in the receiver.

10. The method of claim 1, wherein using the receiver having the impedance selected to be lower than the impedance of seawater allows a larger portion of electrical current to pass between electrodes of the receiver than through the seawater surrounding the receiver.

* * * * *